US011584528B2

(12) United States Patent
Keskin

(10) Patent No.: US 11,584,528 B2
(45) Date of Patent: Feb. 21, 2023

(54) AIRCRAFT TROLLEY RETENTION DEVICE

(71) Applicant: B/E Aerospace, Inc., Winston-Salem, NC (US)

(72) Inventor: Volkan Keskin, London (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 271 days.

(21) Appl. No.: 17/011,771

(22) Filed: Sep. 3, 2020

(65) Prior Publication Data

US 2022/0063811 A1    Mar. 3, 2022

(51) Int. Cl.
| | | |
|---|---|---|
| *B64D 11/04* | (2006.01) | |
| *B64D 11/00* | (2006.01) | |
| *E05C 3/00* | (2006.01) | |
| *E05C 5/02* | (2006.01) | |
| *E05B 65/00* | (2006.01) | |
| *E05C 5/00* | (2006.01) | |

(52) U.S. Cl.
CPC .......... *B64D 11/04* (2013.01); *B64D 11/0007* (2013.01); *E05C 3/004* (2013.01); *E05C 5/02* (2013.01); *B62B 2202/67* (2013.01); *E05B 65/00* (2013.01); *E05C 2005/005* (2013.01)

(58) Field of Classification Search
None
See application file for complete search history.

(56) References Cited

U.S. PATENT DOCUMENTS

| | | | | | |
|---|---|---|---|---|---|
| 1,003,642 | A | * | 9/1911 | Mulholland | ........ E05B 65/0864 |
| | | | | | 292/61 |
| 2,218,960 | A | * | 10/1940 | Rightmyer | .............. E05B 5/003 |
| | | | | | 292/DIG. 31 |
| 2,833,582 | A | * | 5/1958 | Henrichs | ................. E05B 5/003 |
| | | | | | 292/336.3 |

(Continued)

FOREIGN PATENT DOCUMENTS

| | | |
|---|---|---|
| CN | 109676553 A | 4/2019 |
| DE | 202007013514 U1 | 12/2007 |

(Continued)

OTHER PUBLICATIONS

Extended Search Report in European Application No. 21194302.2, dated Jan. 28, 2022, 8 pages.

*Primary Examiner* — Kristina R Fulton
*Assistant Examiner* — Tal Saif
(74) *Attorney, Agent, or Firm* — Suiter Swantz pc llo

(57) ABSTRACT

An aircraft trolley retention device may include a retention latch with a shaft including a first component of an interlocking assembly and a sleeve including a second component of the interlocking assembly and configured to receive the shaft, and an interlocking assembly. The retention latch may be configured to actuate between a closed position and an open position. The interlocking assembly may be configured to guide the retention latch during the actuation between the closed position and the open position. The retention latch may be configured to retain an aircraft trolley within an aircraft trolley bay when the retention latch is in (Continued)

the closed position. A portion of the retention latch may be configured to be positioned in front of a striker plate corresponding to a handle of an aircraft trolley bay door of the aircraft trolley bay when the retention latch is in the open position.

17 Claims, 14 Drawing Sheets

(56) References Cited

U.S. PATENT DOCUMENTS

| | | | | |
|---|---|---|---|---|
| 3,590,610 | A * | 7/1971 | Hayakawa | E05B 65/0078 70/92 |
| 6,010,094 | A | 1/2000 | Csik et al. | |
| 7,441,427 | B2 * | 10/2008 | Vickers | E05B 35/008 292/64 |
| 9,988,831 | B2 | 6/2018 | Burd | |
| 10,718,140 | B1 | 7/2020 | Karapetyan et al. | |
| 2001/0019212 | A1 * | 9/2001 | Fujiwara | E05B 17/0045 292/175 |
| 2008/0001031 | A1 * | 1/2008 | Doebertin | B64D 11/04 244/118.1 |
| 2013/0076214 | A1 * | 3/2013 | Chamberlin | A47B 96/025 312/107 |
| 2013/0257067 | A1 | 10/2013 | Burd | |
| 2014/0152027 | A1 | 6/2014 | Burd | |
| 2016/0060916 | A1 * | 3/2016 | Hernandez | E05C 3/042 292/197 |
| 2018/0016013 | A1 * | 1/2018 | Burd | B64D 9/003 |

FOREIGN PATENT DOCUMENTS

| | | |
|---|---|---|
| EP | 3187671 B1 | 11/2018 |
| FR | 3070709 B1 | 9/2019 |
| GB | 208864 A | 1/1924 |
| GB | 2306553 B | 2/2000 |
| WO | 2008118028 A1 | 10/2008 |

* cited by examiner

AIRCRAFT TROLLEY RETENTION DEVICE

BACKGROUND

An aircraft cabin may include one or more aircraft monuments. An aircraft monument may include one or more aircraft trolley bays. An aircraft trolley bay may include one or more aircraft trolley bay doors. The aircraft trolley bay may be configured to house one or more aircraft trolleys. An aircraft trolley may include an aircraft trolley content door. An aircraft trolley bay door may be required to act as a secondary means of retention for the one or more aircraft trolleys when housed in the corresponding aircraft trolley bay. However, the aircraft trolley bay door may fail under an applied load.

SUMMARY

An aircraft trolley retention device is disclosed, in accordance with one or more embodiments of the disclosure. The retention device may include a retention latch. The retention latch may include a shaft. The retention device may include a sleeve. The sleeve may be configured to receive the shaft. The sleeve may be configured to be coupled to an aircraft trolley bay of an aircraft monument. The retention device may include an interlocking assembly. The shaft may include a first component of the interlocking assembly. The sleeve may include a second component of the interlocking assembly. The retention latch may be configured to actuate between a closed position and an open position following an application of a force to the retention latch. The first component and the second component of the interlocking assembly may be configured to guide the retention latch during the actuation between the closed position and the open position. The retention latch may be configured to retain an aircraft trolley within the aircraft trolley bay when the retention latch is in the closed position. A portion of the retention latch may be configured to be positioned in front of a striker plate corresponding to a handle of an aircraft trolley bay door of the aircraft trolley bay when the retention latch is in the open position.

In some embodiments, the retention device includes a spring configured to fit within the shaft. The spring may be configured to apply the force to the retention latch via the shaft during the actuation between the closed position and the open position.

In some embodiments, the first component of the interlocking assembly may include a pin. The second component of the interlocking assembly may include a track. The pin may be configured to actuate within the track following the application of the force.

In some embodiments, the track may include a horizontal section between a first end and a corner. The track may include an angled section between the corner and a second end.

In some embodiments, the pin may be configured to actuate from the first end to the second end via the horizontal section, the corner, and the angled section when the retention latch actuates between the closed position and the open position following the application of the force.

In some embodiments, the spring may be configured to apply the force to the retention latch during the actuation from the corner to the second end via the angled section when the retention latch actuates between the closed position and the open position.

In some embodiments, the track may include a first horizontal section between a first end and a first corner. The track may include a vertical section between the first corner and a second corner. The track may include a second horizontal section between the second corner and a second end.

In some embodiments, the pin may be configured to actuate from the first end to the second end via the first horizontal section, the first corner, the vertical section, the second corner, and the second horizontal section when the retention latch actuates between the closed position and the open position following the application of the force.

In some embodiments, the spring may be configured to apply the force to the retention latch during the actuation from the first corner to the second corner via the vertical section when the retention latch actuates between the closed position and the open position.

In some embodiments, the retention latch may be configured to retain the aircraft trolley within the aircraft trolley bay via contact with a surface of an aircraft trolley content door of the aircraft trolley when the retention latch is in the closed position.

In some embodiments, the retention latch may be configured to retain the aircraft trolley within the aircraft trolley bay via contact with a surface of a body of the aircraft trolley when the retention latch is in the closed position.

In some embodiments, the retention latch may be configured to allow the aircraft trolley to be removed or inserted into the aircraft trolley bay when the retention latch is in the open position.

In some embodiments, the portion of the retention latch may be configured to be separated a selected distance from the striker plate corresponding to the aircraft trolley bay door of the aircraft trolley bar when the retention latch is in the open position.

In some embodiments, the retention latch may be configured to be in a first plane shared with a striker plate when in the closed position, the retention latch configured to be in a second plane when in the open position, the second plane spaced a selected distance outward from the first plane with respect to the trolley bay such that the retention latch is configured to be separated the selected distance from the striker plate.

An aircraft monument is disclosed, in accordance with one or more embodiments of the disclosure. The aircraft monument may include an aircraft trolley bay. The aircraft trolley bay may include an aircraft trolley bay door. The aircraft trolley bay may include a striker plate corresponding to a handle of the aircraft trolley bay door. The aircraft monument may include an aircraft trolley retention device. The retention device may include a retention latch. The retention latch may include a shaft. The retention device may include a sleeve. The sleeve may be configured to receive the shaft. The sleeve being configured to be coupled to the aircraft trolley bay. The retention device may include an interlocking assembly. The shaft may include a first component of the interlocking assembly. The sleeve may include a second component of the interlocking assembly. The retention latch may be configured to actuate between a closed position and an open position following an application of a force to the retention latch. The first component and the second component of the interlocking assembly may be configured to guide the retention latch during the actuation between the closed position and the open position. The retention latch may be configured to retain an aircraft trolley within the aircraft trolley bay when the retention latch is in the closed position. A portion of the retention latch may be configured to be positioned in front of the striker plate when the retention latch is in the open position.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1B:
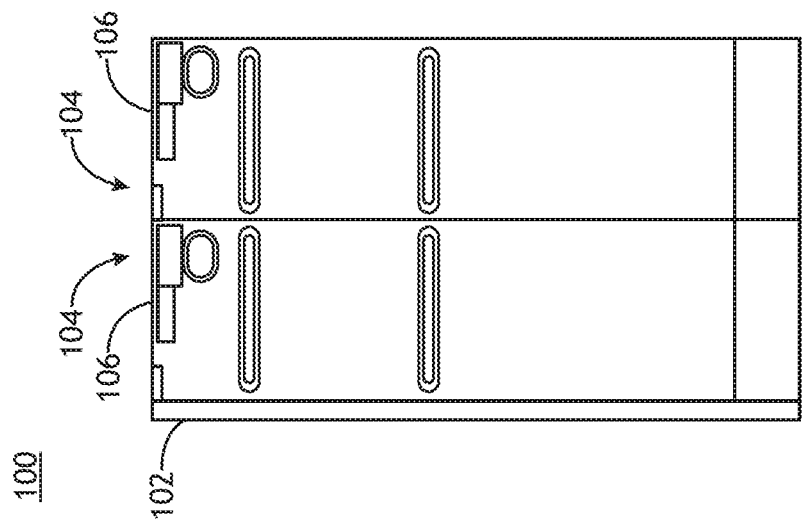
FIG. 1B illustrates a front elevation view of a portion of an aircraft monument including trolley bays with trolley bay doors, in accordance with one or more embodiments of the disclosure.
Figure 1A:
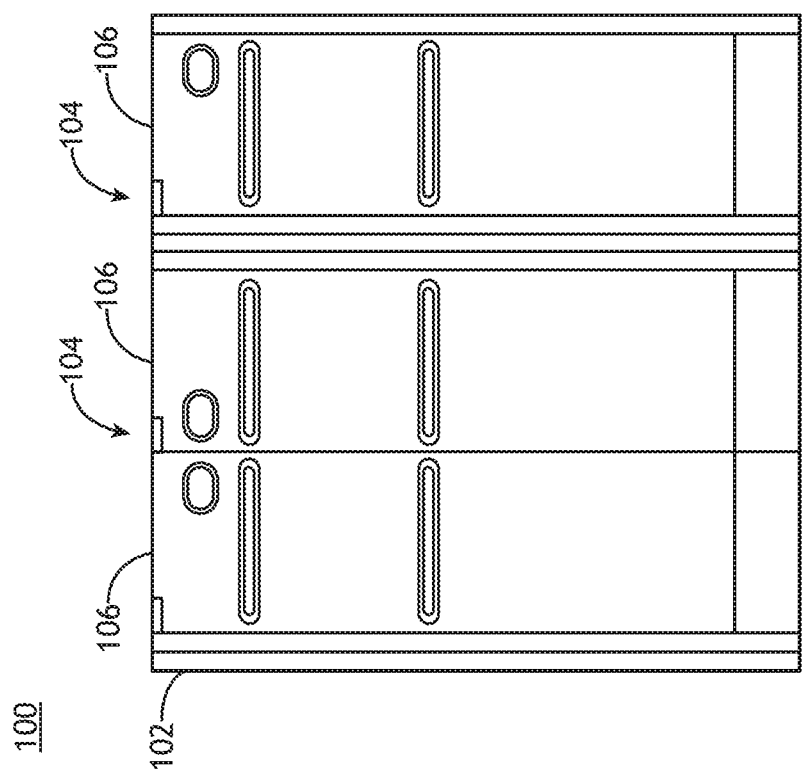
FIG. 1A illustrates a front elevation view of a portion of an aircraft monument including trolley bays with trolley bay doors, in accordance with one or more embodiments of the disclosure.
Figure 1C:
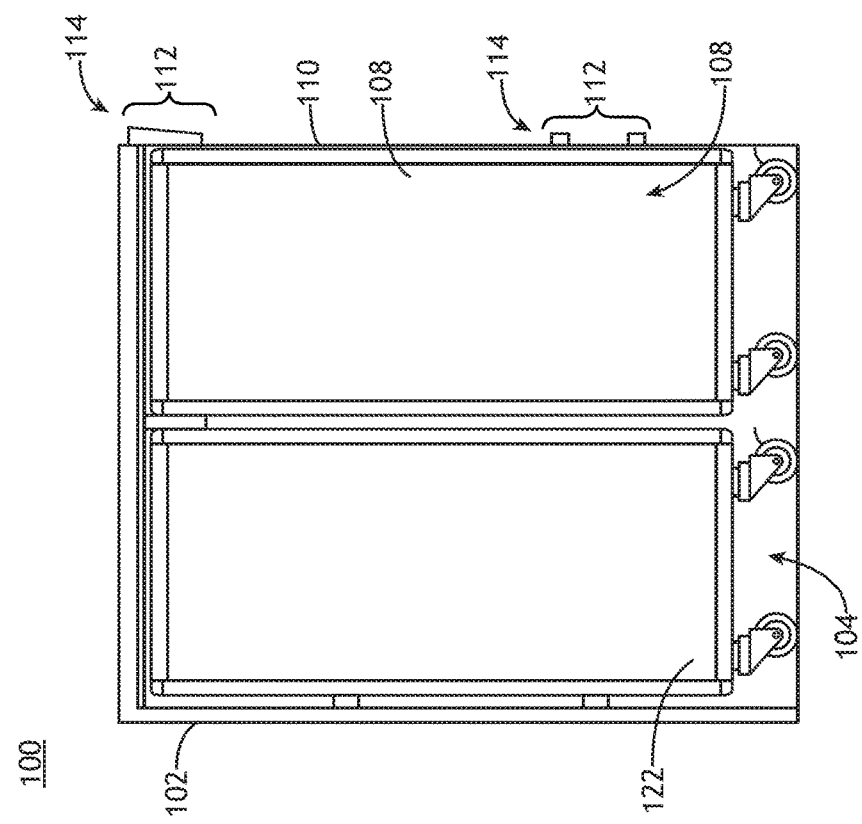
FIG. 1C illustrates a front elevation view of a portion of an aircraft monument including trolley bays configured to house trolleys, in accordance with one or more embodiments of the disclosure.
Figure 1D:
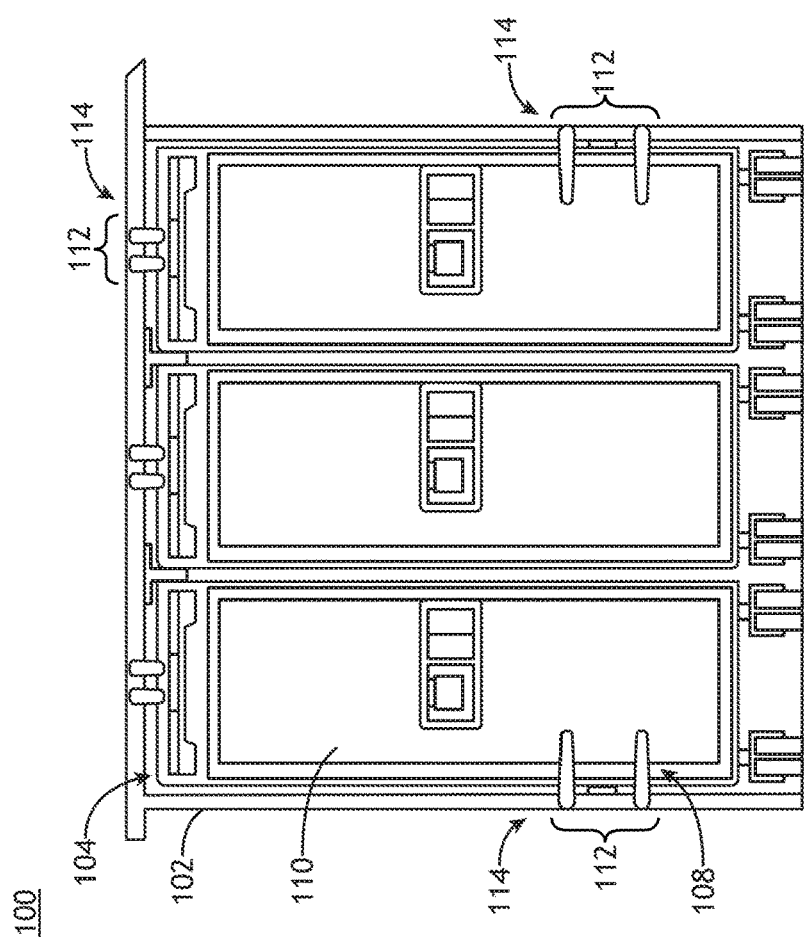
FIG. 1D illustrates a side elevation view of a portion of an aircraft monument including trolley bays configured to house trolleys, in accordance with one or more embodiments of the disclosure.
Figure 1E:
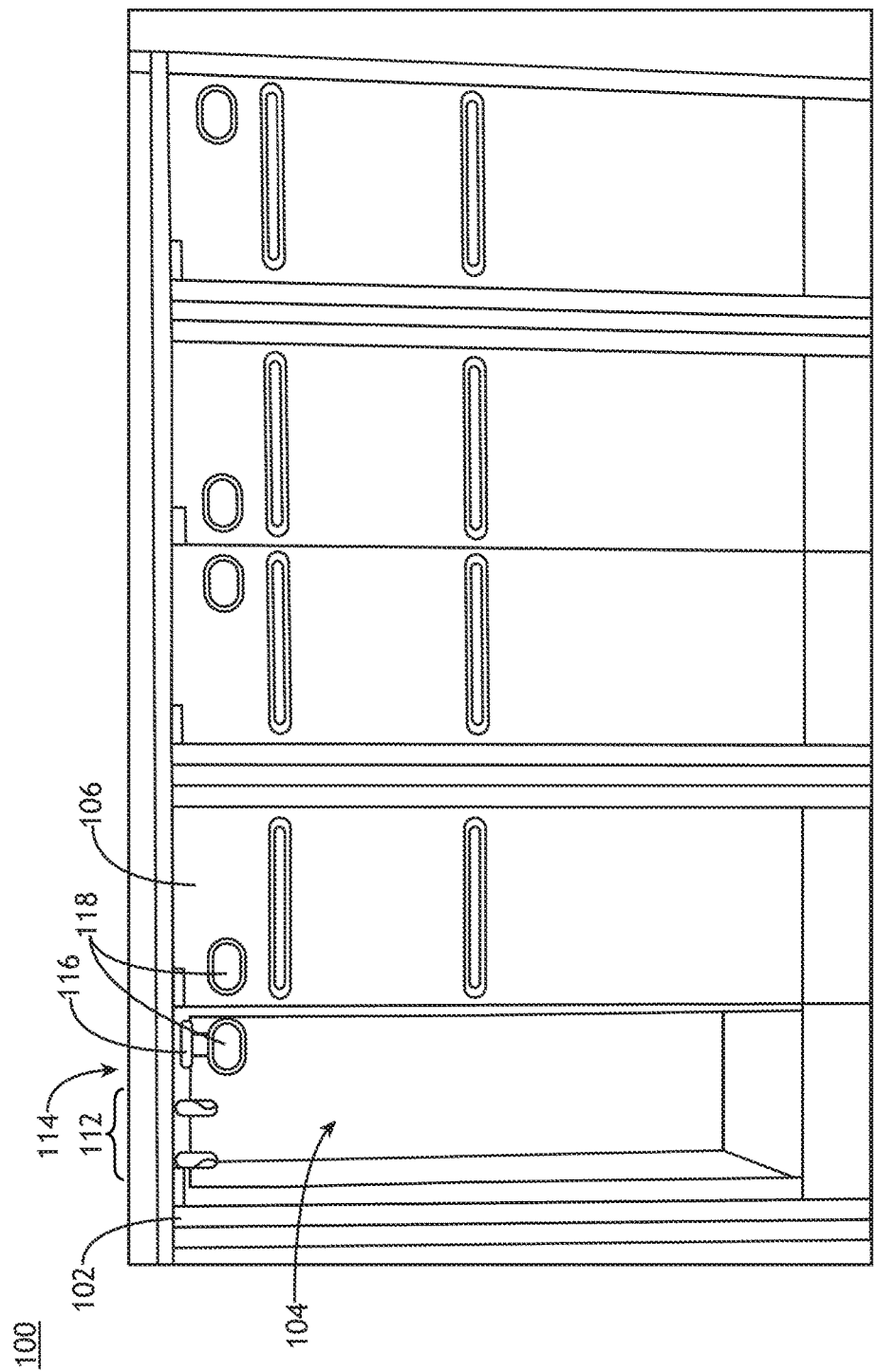
FIG. 1E illustrates a front elevation view of a portion of an aircraft monument including trolley bays with trolley bay doors, a set of latches, and a striker plate, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-4D in general illustrate an aircraft trolley retention device, in accordance with one or more embodiments of the disclosure.

FIGS. 1A-1D in general illustrate an aircraft cabin 100 including one or more aircraft monuments 102, in accordance with one or more embodiments of the disclosure. It is noted herein the one or more aircraft monuments 102 may be forward-facing or rear-facing within the aircraft cabin 100.

An aircraft monument 102 may include one or more aircraft trolley bays 104. For example, the one or more aircraft trolley bays 104 may include a double trolley bay, a single trolley bay door, or the like. It is noted herein "aircraft trolley bay" and variants of the term including, but not limited to, "trolley bay," or the like may be considered equivalent, for purposes of the disclosure.

A trolley bay 104 may include one or more aircraft trolley bay doors 106. For example, the one or more trolley bay doors 106 may be a double trolley bay door, a single trolley bay door, a bi-fold trolley bay door, or the like. It is noted herein "aircraft trolley bay door" and variants of the term including, but not limited to, "trolley bay door," or the like may be considered equivalent, for purposes of the disclosure.

The trolley bay 104 may be configured to house one or more aircraft trolleys 108. For example, the one or more aircraft trolleys 108 may include full-size aircraft trolleys or reduced-size aircraft trolleys (e.g., half-size aircraft trolleys, or the like). It is noted herein "aircraft trolley," "trolley," "cart," "trolley cart," or the like may be considered equivalent, for purposes of the disclosure.

An aircraft trolley 108 may include a trolley content door 110. The trolley bay door 106 and the trolley content door 110 may be hinged on a same side, such that the trolley bay door 106 may rotate about an axis in the same direction as the trolley content door 110 (e.g., both counter-clockwise (CCW) or both clockwise (CW)). The trolley bay door 106 and the trolley content door 110 may be hinged on different sides, such that the trolley bay door 106 may rotate in a different direction as the trolley content door 110 (e.g., CCW for the trolley bay door 106 versus CW for the trolley content door 110, or vice versa). It is noted herein "aircraft trolley content door" and variants of the term including, but not limited to, "trolley content door," or the like may be considered equivalent, for purposes of the disclosure.

The trolley bay 104 may include one or more sets of latches 112 positioned at one or more locations 114 within the trolley bay 104 against the trolley 108. For example, the one or more sets of latches 112 may include one or more short latches 112 configured to retain the trolley 108. For instance, the one or more short latches 112 may be at a top location 114 within the trolley bay 104. By way of another example, the one or more sets of latches 112 may include one or more long latches 112 configured to retain the trolley 108 and the trolley content door 110. For instance, the one or more long latches 112 may be located at a side location 114. It is noted herein the trolley bay 104 may include one or more set of latches 112 at a combination of locations 114 (e.g., a top location 114 and side locations 114, or the like).

The one or more sets of latches 112 may be configured to rotate about an axis between a closed position and an open position. For example, the closed position may be a position in which the one or more sets of latches 112 may retain the trolley 108. By way of another example, the open position may be a position in which the one or more sets of latches 112 may allow the trolley 108 to be removed or inserted into the trolley bay 104. A latch 112, when rotating between the closed position and the open position, may avoid a striker plate 116 corresponding to a handle 118 of a trolley bay door 106. It is noted herein the one or more sets of latches 112 may stay within a single plane 120 (e.g., an x-z plane) when rotating about the axis (e.g., a y-axis). In addition, it is noted herein the single plane 120 may be a plane shared with the striker plate 116.

The trolley 108 may include a body 122. The trolley content door 110 may be coupled to the body 122 of the trolley 108. The body 122 of the trolley 108 may be configured to fit within the trolley bay 104. For example, the body 122 of each of multiple trolleys 108 may be configured to fit within a single trolley bay 104. For instance, the multiple trolleys 108 may be configured to fit side-by-side. In addition, the multiple trolleys 108 may be configured to fit end-to-end.

The trolley bay door 106 may be required to act as a secondary means of retention for the one or more trolleys 108 when housed in the corresponding trolley bay 104. For example, the trolley bay door may need to be configured in accordance with aviation guidelines and/or standards set forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), SAE International, or any other standards setting organization or company; the Radio Technical Commission for Aeronautics (RTCA) or any other guidelines agency or organization; or the like. For instance, SAE International's Aerospace Standard (AS) 8056, MINIMUM DESIGN AND PERFORMANCE OF AIRPLANE GALLEY IN-FLIGHT CARTS, CONTAINERS, AND ASSOCIATED COMPONENTS, and EASA's European Technical Standard Order (ETSO) C175, GALLEY CART, CONTAINERS AND ASSOCIATED COMPONENTS sets forth requirements for galley carts, containers and associated components.

However, the trolley bay door 106 may fail under an applied load. A shifting trolley 108 and/or an application of a force to the trolley content door 110 (e.g., trolley contents shifting within the trolley 108, or the like) may result in a contact and subsequent deflection and/or failure of the trolley bay door 106. It is noted herein the trolley bay door 106 and the trolley content door 110 being hinged on the same side may result in a maximum momentum in the trolley content door 110 leading to a maximum loading on the trolley bay door 106 (or, more specifically, on a latch of the trolley bay door 106), resulting in the deflection and/or failure.

As such, it would be beneficial to provide an aircraft trolley retention device. The aircraft trolley retention device should be configured to allow the trolley bay doors 106 to retain the trolley 108 and/or the trolley content doors 110, while preventing the trolley bay doors 106 from deflecting beyond a selected distance. The aircraft trolley retention device should be configured to be separated from (e.g., not collide or otherwise interfere with) the striker plate 116 corresponding to the handle 118 of the trolley bar door 106.

FIGS. 2A-2F in general illustrate the aircraft cabin 100 including the one or more aircraft monuments 102 with one or more aircraft trolley retention devices 200, in accordance with one or more embodiments of the disclosure. It is noted herein "aircraft trolley retention devices" and variants of the term including, but not limited to, "retention device," or the like may be considered equivalent, for purposes of the disclosure.

A retention device 200 may include a retention latch 202. The retention latch 202 may be configured to actuate between a closed position and an open position. For example, the closed position may be a position in which the retention latch 202 may retain the trolley 108. By way of another example, the open position may be a position in which the retention latch 202 may allow the trolley 108 to be removed or inserted into the trolley bay 104.

The retention latch 202 may be inserted within a block 204 coupled to a structure (e.g., frame member, cross member, or the like) within the trolley bay 104. For example, both the latch 112 and the retention latch 202 may be inserted into a same block 204. By way of another example, the latch 112 and the retention latch 202 may be inserted into different blocks 204. It is noted herein, however, the retention latch 202 may be inserted directly into the structure within the trolley bay 104.

The retention latch 202 may be of an increased length as compared to a length of the latch 112. The increased length of the retention latch 202 may allow the retention device 200 to make contact at least one of a portion of an exterior surface of the trolley content door 110 or a portion of an exterior surface of the body 122 of the trolley 108. It is noted herein that one example of "exterior surface" may be an outward-facing surface defined with respect to an opening of the trolley bay 104 leading into an aircraft galley of the aircraft cabin 100.

Figure 1F:
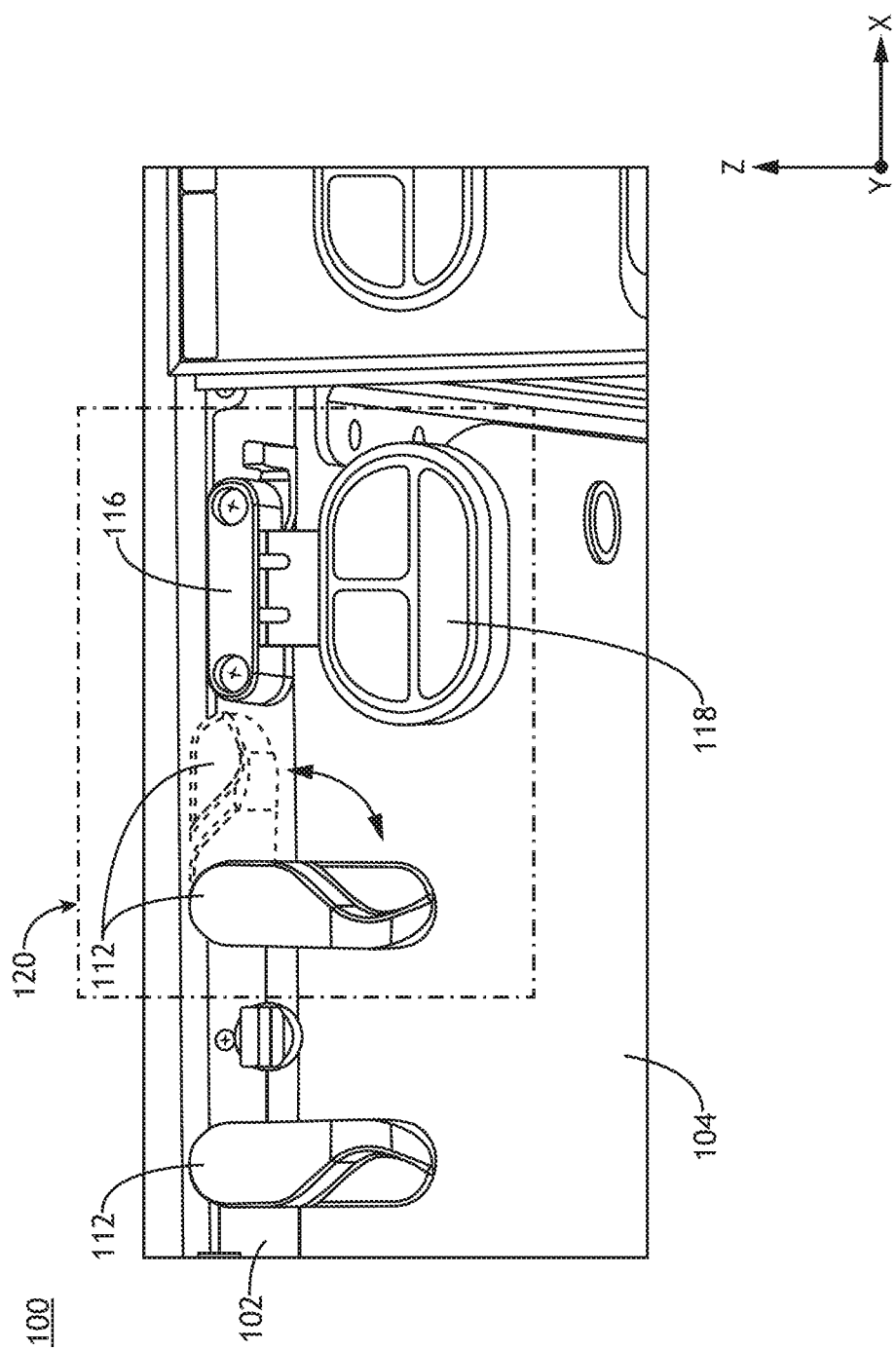
FIG. 1F illustrates a front elevation view of a portion of an aircraft monument including a trolley bay with a set of latches and a striker plate, in accordance with one or more embodiments of the disclosure.
Figure 2A:
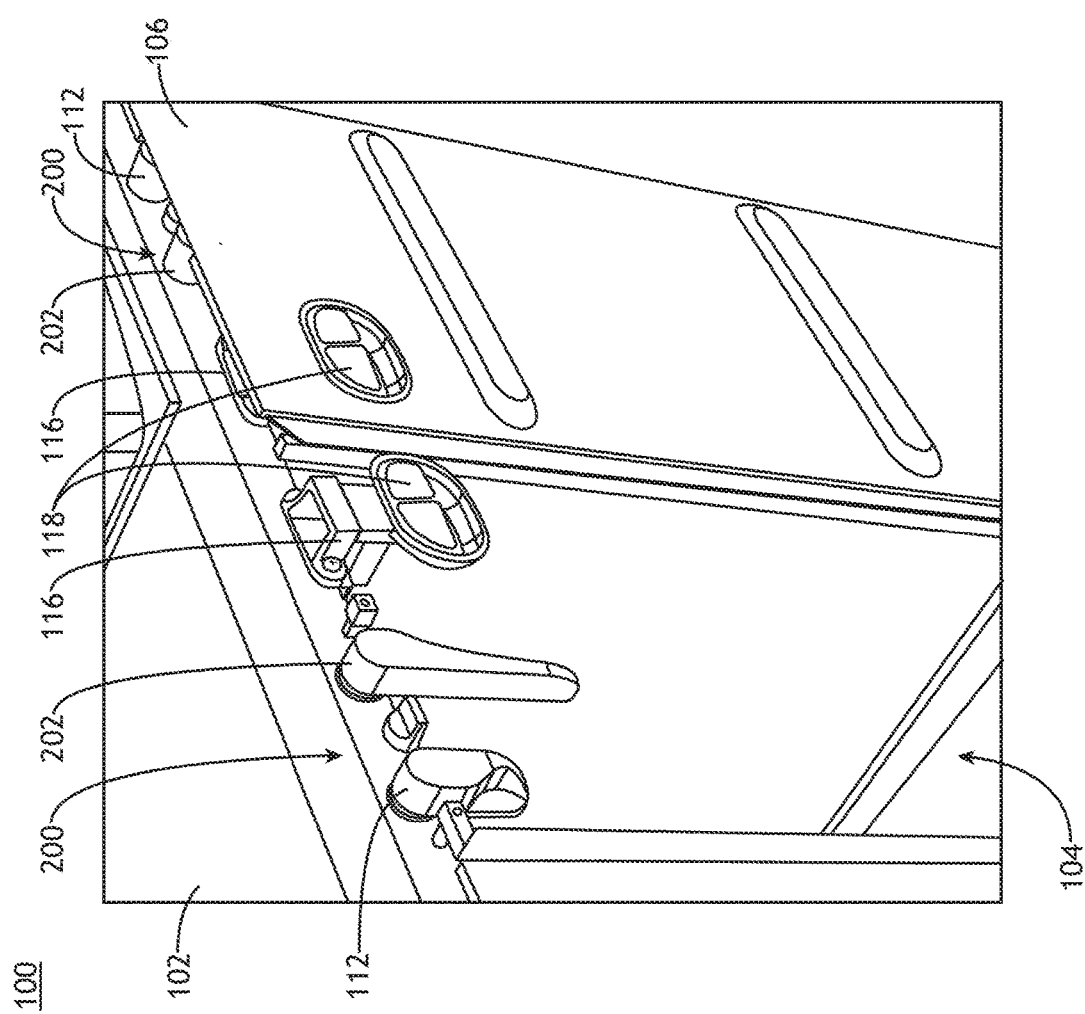
FIG. 2A illustrates a perspective view of a portion of an aircraft monument including trolley bays with trolley bay doors, a latch, an aircraft trolley retention device, and a striker plate, in accordance with one or more embodiments of the disclosure.
Figure 2B:
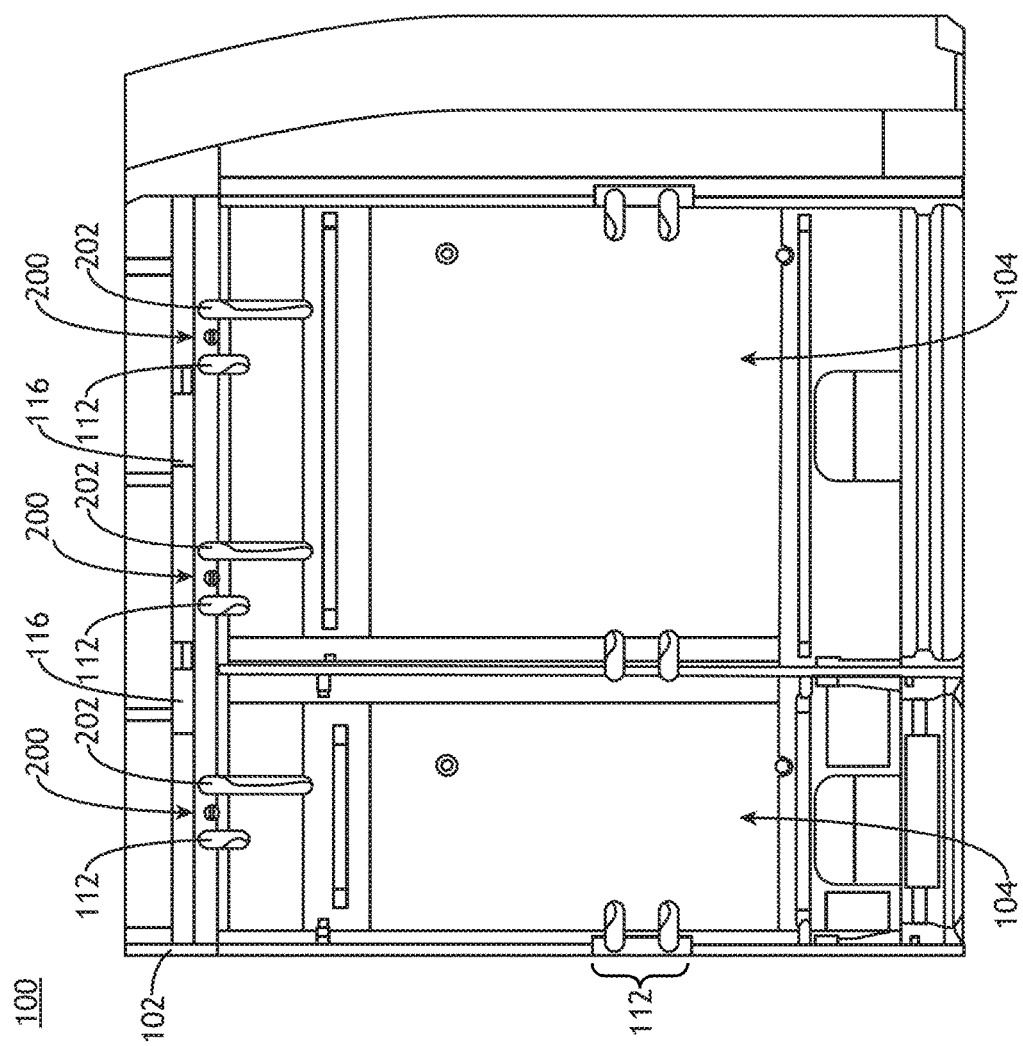
FIG. 2B illustrates a front elevation view of a portion of an aircraft monument including trolley bays with latches, aircraft trolley retention devices, and striker plates, in accordance with one or more embodiments of the disclosure.
Figure 2C:
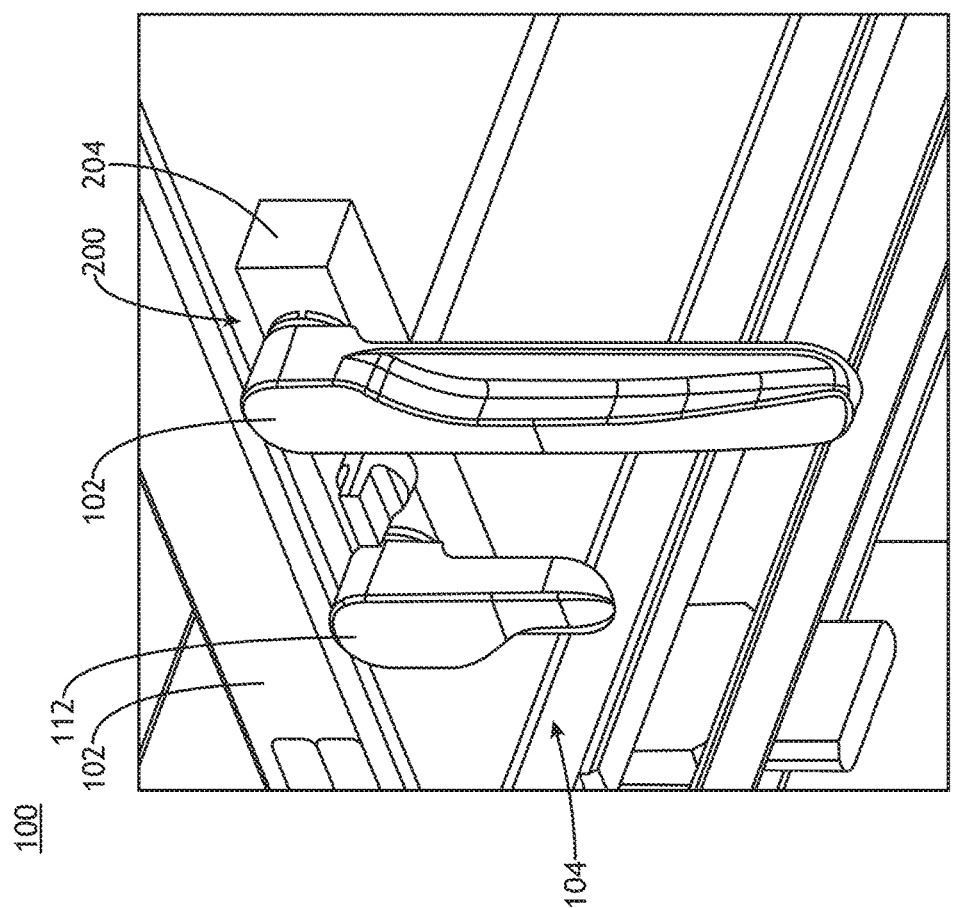
FIG. 2C illustrates a perspective view of a portion of an aircraft monument including trolley bays with a latch, an aircraft trolley retention device, and a striker plate, in accordance with one or more embodiments of the disclosure.
Figure 2D:
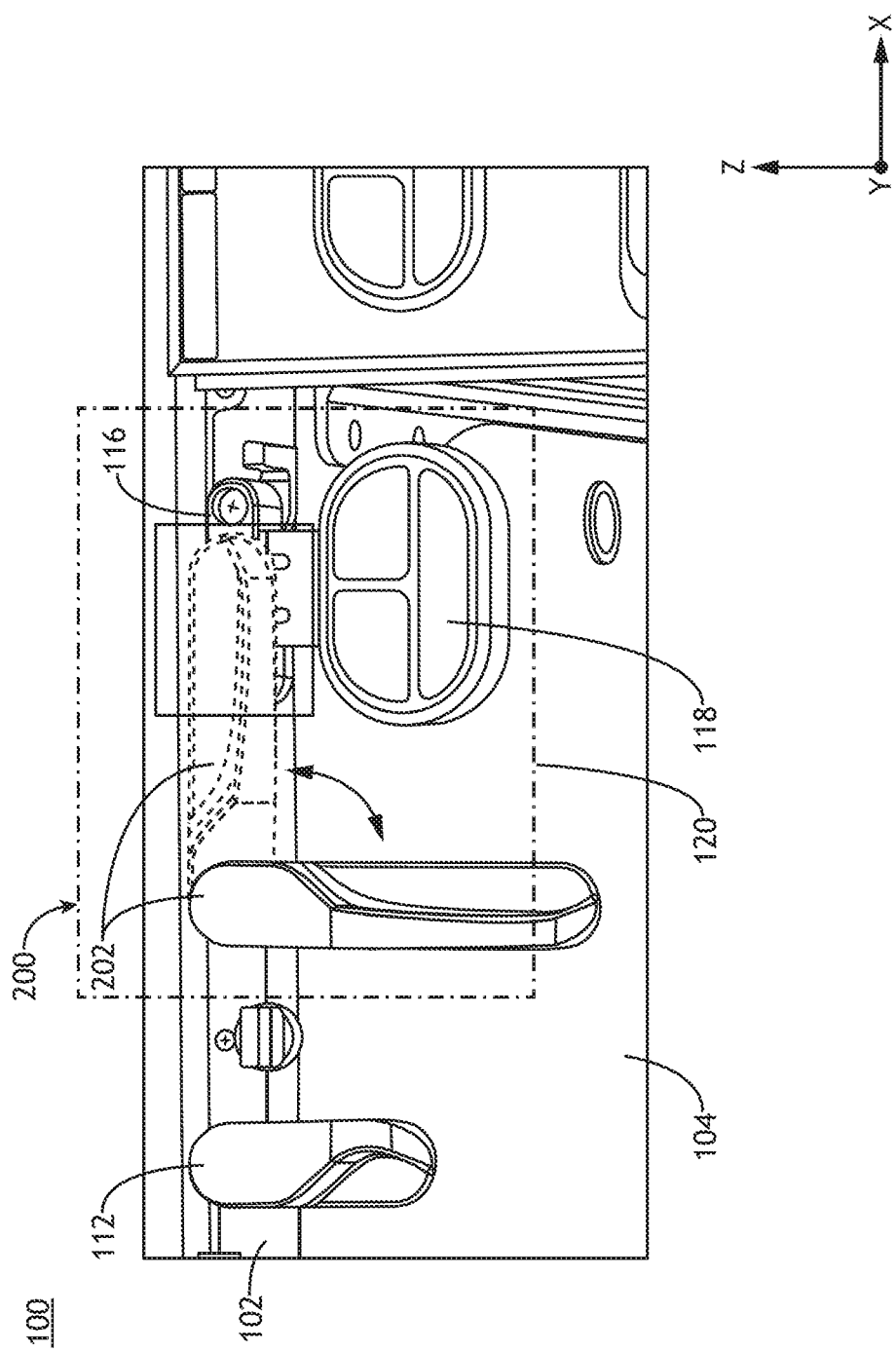
FIG. 2D illustrates a front elevation view of a portion of an aircraft monument including a trolley bay with a latch and an aircraft trolley retention device, in accordance with one or more embodiments of the disclosure.
Figure 2E:
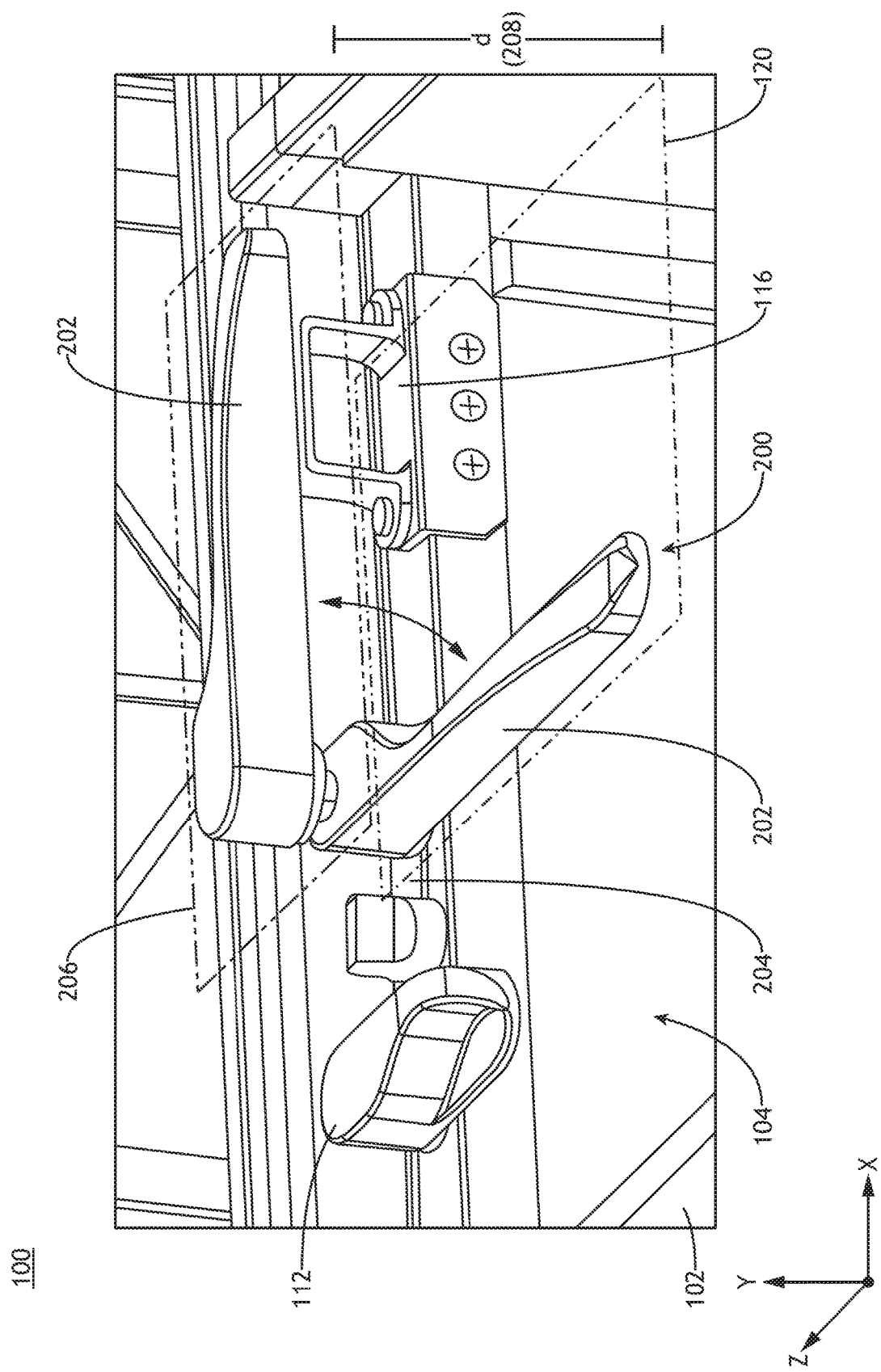
FIG. 2E illustrates a perspective view of a portion of an aircraft monument including a trolley bay with a latch, an aircraft trolley retention device, and a striker plate, in accordance with one or more embodiments of the disclosure.
Figure 2F:
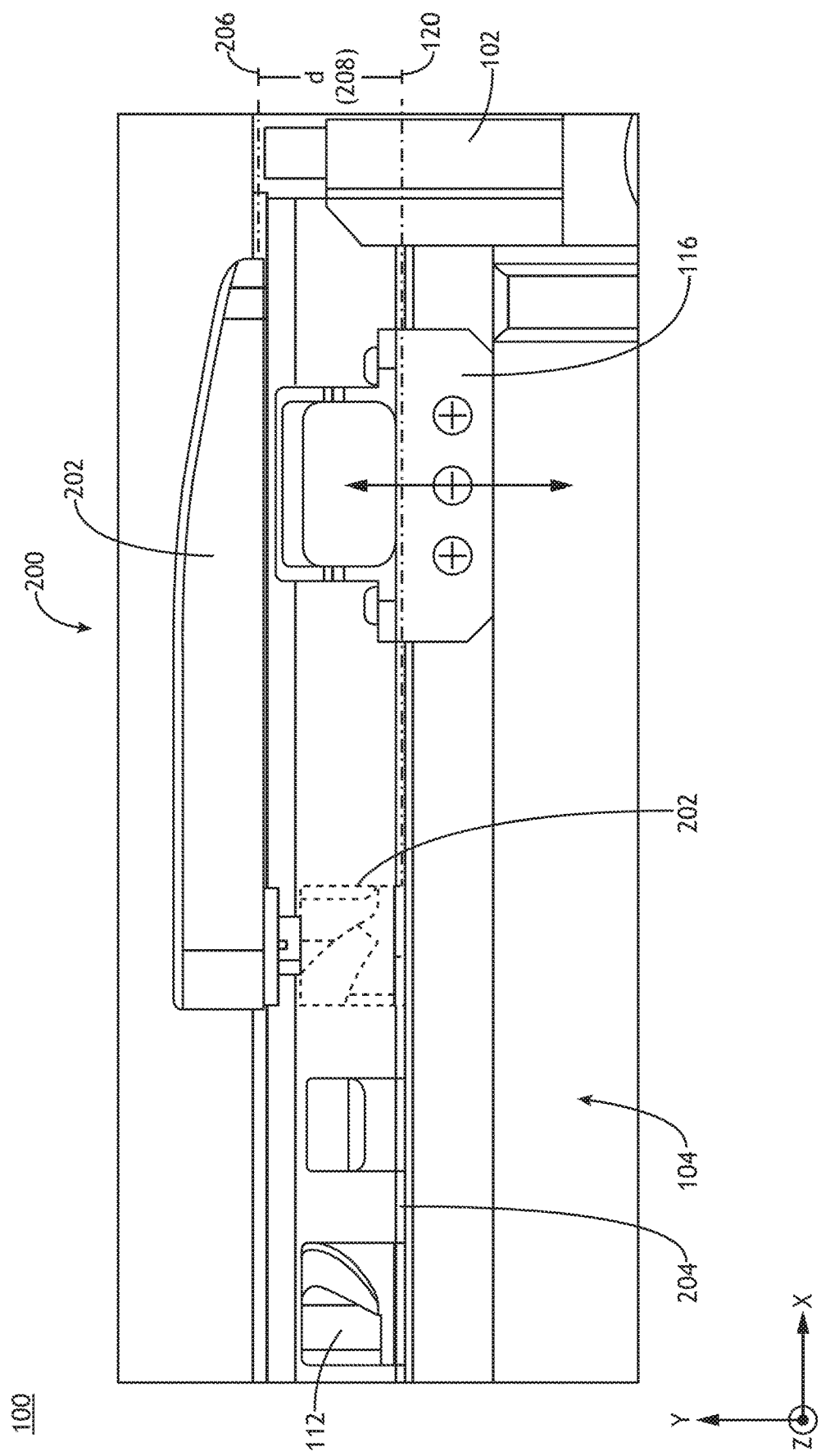
FIG. 2F illustrates a bottom plan view of a portion of an aircraft monument including a trolley bay with a latch, an aircraft trolley retention device, and a striker plate, in accordance with one or more embodiments of the disclosure.

Unlike the latch 112 (e.g., as illustrated in FIG. 1F), the increased length of the retention latch 202 may cause the retention latch 202 to not avoid the striker plate 116 corresponding to the handle 118 of the trolley bay door 106 during a simple rotation about an axis between the closed position and the open position, resulting in a collision or other interference.

In this regard, the retention latch 202 may be actuated, where the actuation includes a combination of at least one rotation motion and at least one translation motion, such that the retention latch 202 may be positioned in front of or outward from the striker plate 116. In addition, the retention latch 202 may be separated from (e.g., does not collide or otherwise interfere with) the striker plate 116.

It is noted herein the combination of at least one rotation motion and at least one translation motion may cause the retention latch 202 to shift outward from the plane 120 (e.g., a first x-z plane) to a second plane 206 (e.g., a second x-z plane) when rotating about the axis (e.g., a y-axis) between the closed position and the open position. For example, the plane 120 may be shared with the striker plate 116. By way of another example, the second plane 206 may be spaced a select distance 208 outward from the shared first plane, allowing the retention latch 202 to actuate in front of or outward from the striker plate 116. It is noted herein that one example of "outward" may be with respect to an opening of the trolley bay 104 leading into an aircraft galley of the aircraft cabin 100. In addition, it is noted herein the retention latch 202 may interfere with a closure of the trolley bay door 106 if the retention latch 202 is left in the open position during the closure.

FIGS. 3A-3D in general illustrate an example embodiment of the retention device 200, in accordance with one or more embodiments of the disclosure.

The retention latch 202 may include a shaft 300. For example, the shaft 300 may be coupled to the retention latch 202. By way of another example, the shaft 300 and the retention latch 202 may be fabricated as a single component.

The retention device 200 may include a sleeve 302. The shaft 300 may be configured to fit within and actuate within the sleeve 302, such that the sleeve 302 may be configured to receive the shaft 300. For example, the shaft 300 may include a cross-section dimensioned to fit within a cross-section of the sleeve 302. For instance, each cross-section may have 1, 2, up to an N number of sides. Although not shown, the sleeve 302 may be configured to be inserted into a structure and/or be coupled to a structure in the trolley bay 104. For example, the sleeve 302 may be configured to fit within the block 204.

The sleeve 302 may include a track 304. The track 304 may be J-shaped or L-shaped, depending on a handedness of the retention device 200 and an arrangement of corresponding components within the trolley bay 104 (e.g., the striker plate 116, or the like). For example, an angle between two adjacent sections of the track 304 may range from 0 degrees to 90 degrees, depending on at least a change of orientation when the retention latch 202 is actuating and/or a final orientation of the retention latch 202 desired after actuation.

The shaft 300 may include a pin 306 configured to actuate within or along the track 304. For example, the pin 306 may be coupled to the shaft 300. By way of another example, the pin 306 and the shaft 300 may be fabricated as a single component.

Although embodiments of the disclosure illustrate the sleeve 302 including the track 304 and the shaft 300 including the pin 306, it is noted herein the components of the retention device 200 may not be limited to that arrangement. For example, the shaft 300 may include the track 304 and the sleeve 302 may include the pin 306. Therefore, the above description should not be interpreted as a limitation on the present disclosure but merely an illustration.

The track 304 and the pin 306 may be configured to guide the retention latch 202 during the actuation between the closed position and the open position. It is noted herein the combination of the track 304 and the pin 306 may be considered an interlocking assembly 308 of the retention device 200. In addition, it is noted herein the interlocking assembly 308 is not limited to the track 304 and the pin 306, but may instead include any number of interlocking components configured to cause the shaft 300 (and thus the retention latch 202) to actuate in a particular, motion-restrained manner with respect to the sleeve 302. In this regard, the track 304 and the pin 306 may in general be considered a first interlocking component and a second interlocking component of the interlocking assembly 308, respectively. As such, the first component and the second component of the interlocking assembly 308 may be configured to guide the retention latch 202 during the actuation between the closed position and the open position.

A spring 310 may be inserted between the shaft 300 and the sleeve 302. For example, the spring 310 may be configured to apply a force to the retention latch 202 to assist the retention latch 202 to actuate to, and remain in, the open position. In general, the retention device 200 may include any component configured to apply a force to the retention latch 202 to assist the retention latch 202 to actuate to, and remain in, the open position. It is noted herein, however, that the force may be applied by a user, such that the spring 310 (or the component configured to apply the force to the retention latch 202) may not be required or may be reduced in necessity.

It is noted herein the spring 310 has been removed from the detailed views of the retention device 200 in FIGS. 3A-3D, for purposes of clarity.

Figure 3B:
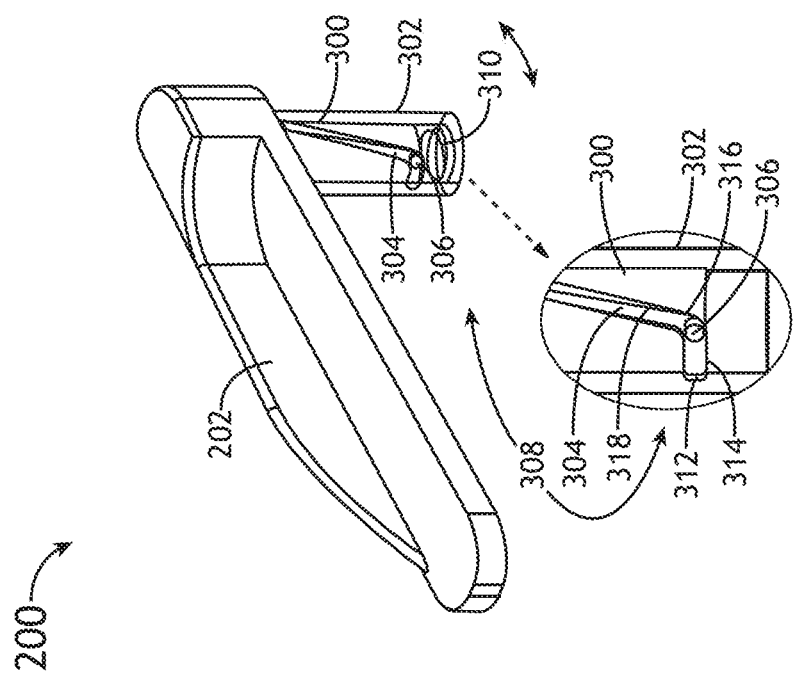
FIG. 3B illustrates a perspective view of an aircraft trolley retention device, in accordance with one or more embodiments of the disclosure.
Figure 3A:
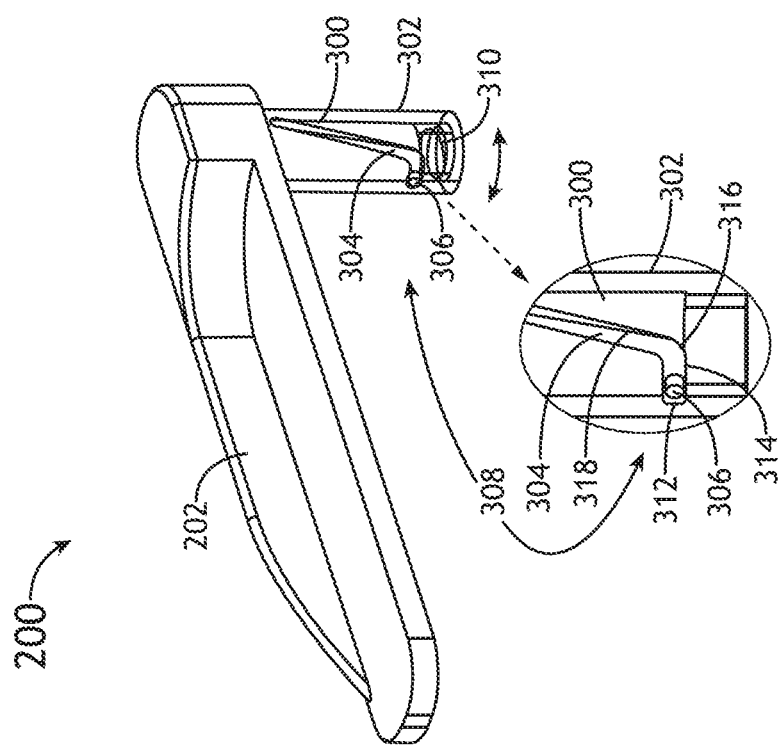
FIG. 3A illustrates a perspective view of an aircraft trolley retention device, in accordance with one or more embodiments of the disclosure.

As illustrated in FIG. 3A, the retention latch 202 may be in a closed position (e.g., configured to retain a trolley 108), with the pin 306 set in a first end 312 of the track 304. The first end 312 of the track 304 may lead to a horizontal or substantially-horizontal section 314 of the track 304. For example, the horizontal or substantially-horizontal section 314 of the track 304 may be a section not configured to allow actuation in a vertical or substantially-vertical direction when the shaft 300 is acted on by the spring 310, preventing the possible stowing of the retention latch 202 (e.g., which may interfere with the trolley bay door 106, or the like). The horizontal or substantially-horizontal section 314 of the track 304 may lead to a corner 316 of the track 304.

As illustrated in FIG. 3B, the retention latch 202 may actuate in a first direction from the first end 312 of the track 304 to the corner 316 of the track 304. The corner 316 of the track 304 may lead to an angled section 318 of the track 304. For example, the angled section 318 of the track 304 may include a section configured to allow actuation in a vertical or substantially-vertical direction when the shaft 300 is acted on by the spring 310. For instance, the actuation may include a translation in the vertical or substantially-vertical direction, in combination with a rotation about an axis through the shaft 300. The angled section 318 of the track 304 may lead to a second end 320 of the track 304.

Although not shown, the actuation in the first direction from the first end 312 of the track 304 to the corner 316 of the track 304 may be following a force applied to the retention latch 202 by a user. For example, the force applied by the user may include a rotational force.

Figure 3C:
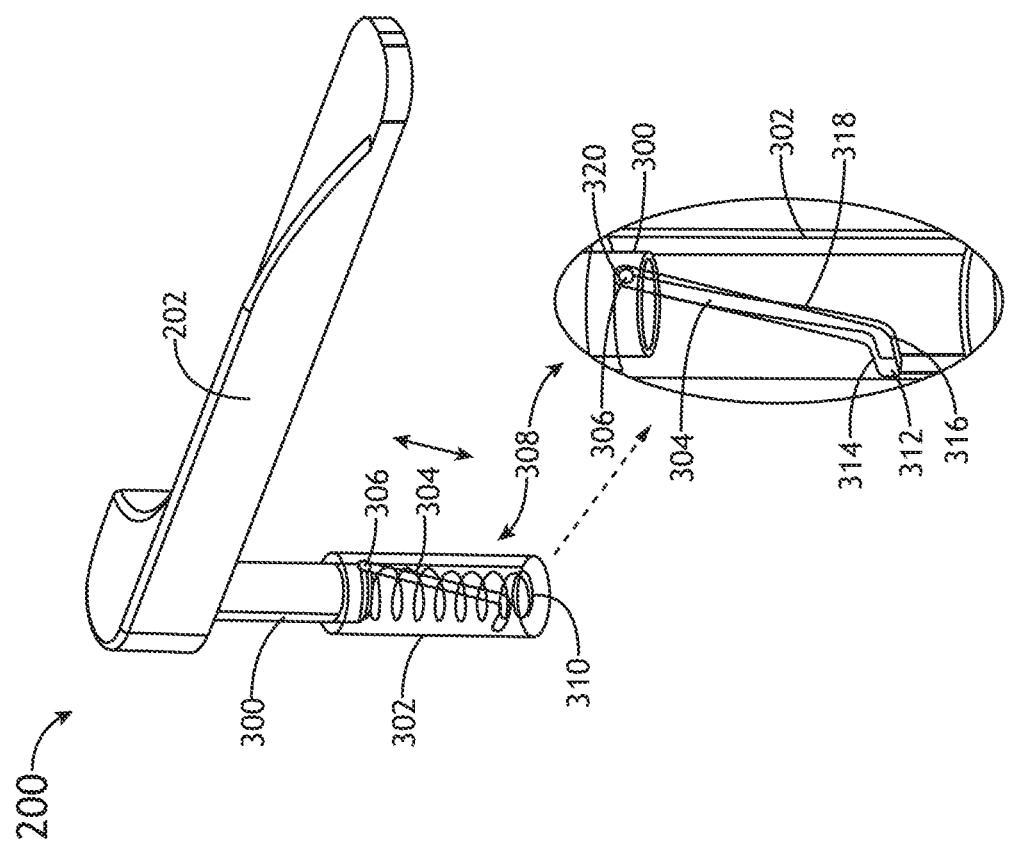
FIG. 3C illustrates a perspective view of an aircraft trolley retention device, in accordance with one or more embodiments of the disclosure.

As illustrated in FIG. 3C, the pin 306 may actuate along the angled section 318 of the track 304. For example, the actuation along the angled section 318 of the track 304 may be driven by the shaft 300 being acted on by the spring 310. The pin 306 may actuate from the corner 316 of the track 304 to the second end 320 of the track 304. It is noted herein the combination of the pin 306, the track 304, and the spring 310 may cause the retention latch 202 to rotate about the axis through the shaft during translation.

Figure 3D:
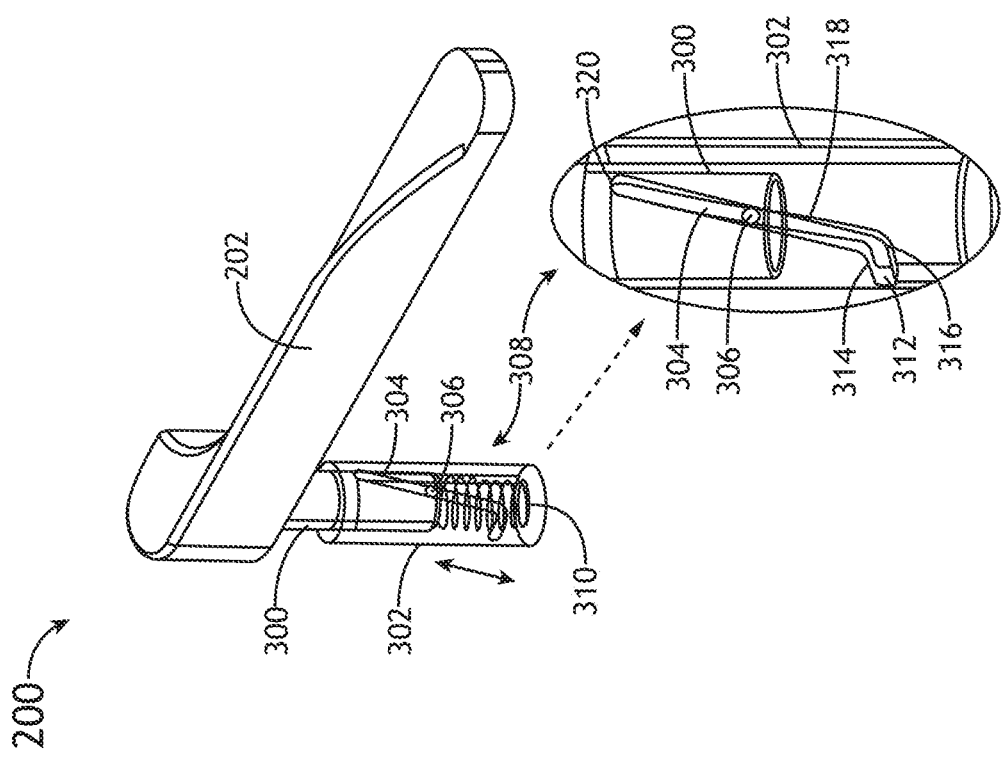
FIG. 3D illustrates a perspective view of an aircraft trolley retention device, in accordance with one or more embodiments of the disclosure.

As illustrated in FIG. 3D, the pin 306 may rest in the second end 320 of the track 304 following actuation in a second direction from the corner 316 of the track 304 to the second end 320 of the track 304. Here, the retention latch 202 may be in an open position.

Although not shown, the retention latch 202 may be actuated from the open position to the closed position via a force applied to the retention latch 202 by a user to overcome the force applied by the spring 310. For example, the force applied by the user may include a first amount of force configured to cause the pin 306 to actuate from the second end 320 of the track 304 to the corner 316 of the track 304, and may include a second amount of force configured to cause the pin 306 to actuate from the corner 316 of the track 304 to the first end 312 of the track 304. It is noted herein the first amount of force and the second amount of force may be separately applied or applied in one fluid motion. In this regard, the actuation of the retention latch 202 may be considered reversible or dual-direction.

FIGS. 4A-4D in general illustrate an example embodiment of the retention device 200, in accordance with one or more embodiments of the disclosure.

The retention latch 202 may include a shaft 400. For example, the shaft 400 may be coupled to the retention latch 202. By way of another example, the shaft 400 and the retention latch 202 may be fabricated as a single component.

The retention device 200 may include a sleeve 402. The shaft 400 may be configured to fit within and actuate within the sleeve 402, such that the sleeve 402 may be configured to receive the shaft 400. For example, the shaft 400 may include a cross-section dimensioned to fit within a cross-section of the sleeve 402. For instance, each cross-section may have 1, 2, up to an N number of sides. Although not shown, the sleeve 402 may be configured to be inserted into a structure and/or be coupled to a structure in the trolley bay 104. For example, the sleeve 402 may be configured to fit within the block 204 coupled to a structure in the trolley bay 104.

The sleeve 402 may include a track 404. The track 404 may be Z-shaped or S-shaped, depending on a handedness of the retention device 200 and an arrangement of corresponding components within the trolley bay 104 (e.g., the striker plate 116, or the like). For example, an angle between two adjacent sections of the track 404 may range from 0 degrees to 90, depending on at least a change of orientation when the retention latch 202 is actuating and/or a final orientation of the retention latch 202 desired after actuation.

The shaft 400 may include a pin 406 configured to actuate within or along the track 404. For example, the pin 406 may be coupled to the shaft 400. By way of another example, the pin 406 and the shaft 400 may be fabricated as a single component.

Although embodiments of the disclosure illustrate the sleeve 402 including the track 404 and the shaft 400 including the pin 406, it is noted herein the components of the retention device 200 may not be limited to that arrangement. For example, the shaft 400 may include the track 404 and the sleeve 402 may include the pin 406. Therefore, the above description should not be interpreted as a limitation on the present disclosure but merely an illustration The track 404 and the pin 406 may be configured to guide the retention latch 202 during the actuation between the closed position and the open position. It is noted herein the combination of the track 404 and the pin 406 may be considered an interlocking assembly 408 of the retention device 200. In addition, it is noted herein the interlocking assembly 408 is not limited to the track 404 and the pin 406, but may instead include any number of interlocking components configured to cause the shaft 400 (and thus the retention latch 202) to actuate in a particular, motion-restrained manner with respect to the sleeve 402. In this regard, the track 404 and the pin 406 may in general be considered a first interlocking component and a second interlocking component of the interlocking assembly 408, respectively. As such, the first component and the second component of the interlocking assembly 408 may be configured to guide the retention latch 202 during the actuation between the closed position and the open position.

A spring 410 may be inserted between the shaft 400 and the sleeve 402. For example, the spring 410 may include, but is not limited to, a spring configured to apply a force to the retention latch 202 to assist the retention latch 202 into the open position. In general, the retention device 200 may include any component configured to apply a force to the retention latch 202 to assist the retention latch 202 to actuate to, and remain in, the open position. It is noted herein, however, that the force may be applied by a user, such that the spring 410 (or the component configured to apply the force to the retention latch 202) may not be required or may be reduced in necessity.

It is noted herein the spring 410 has been removed from the detailed views of the retention device 200 in FIGS. 4A-4D, for purposes of clarity.

Figure 4B:
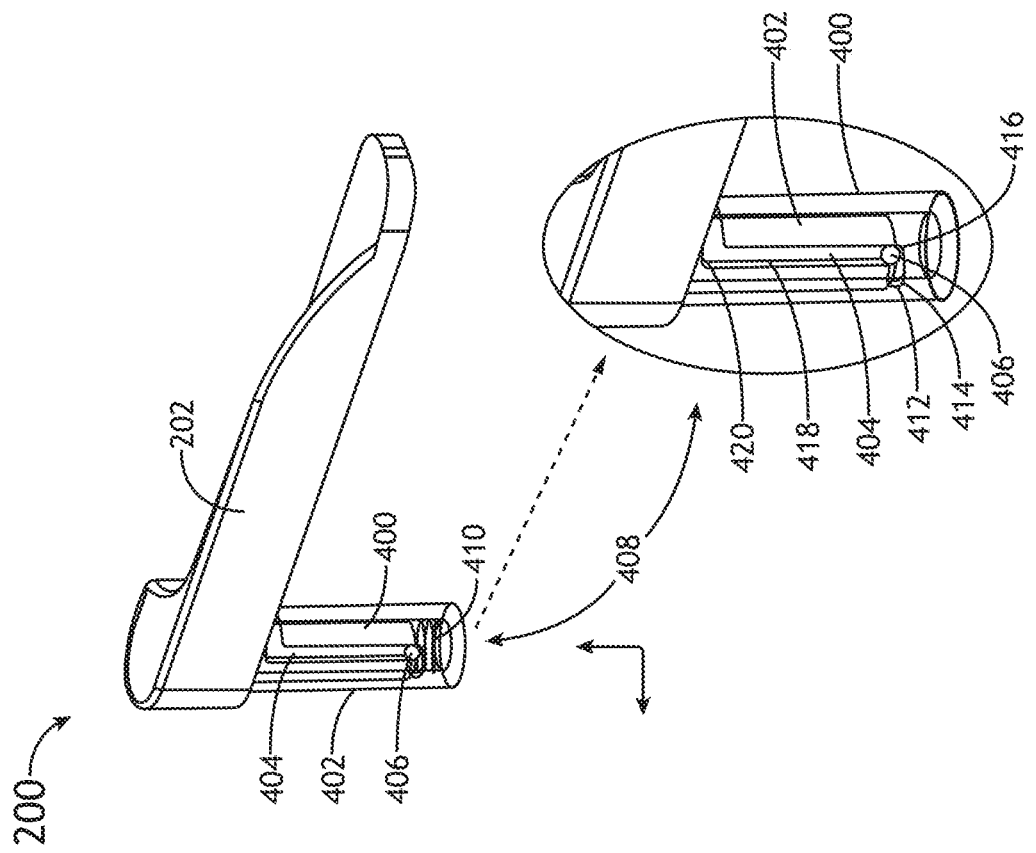
FIG. 4B illustrates a perspective view of an aircraft trolley retention device, in accordance with one or more embodiments of the disclosure.
Figure 4A:
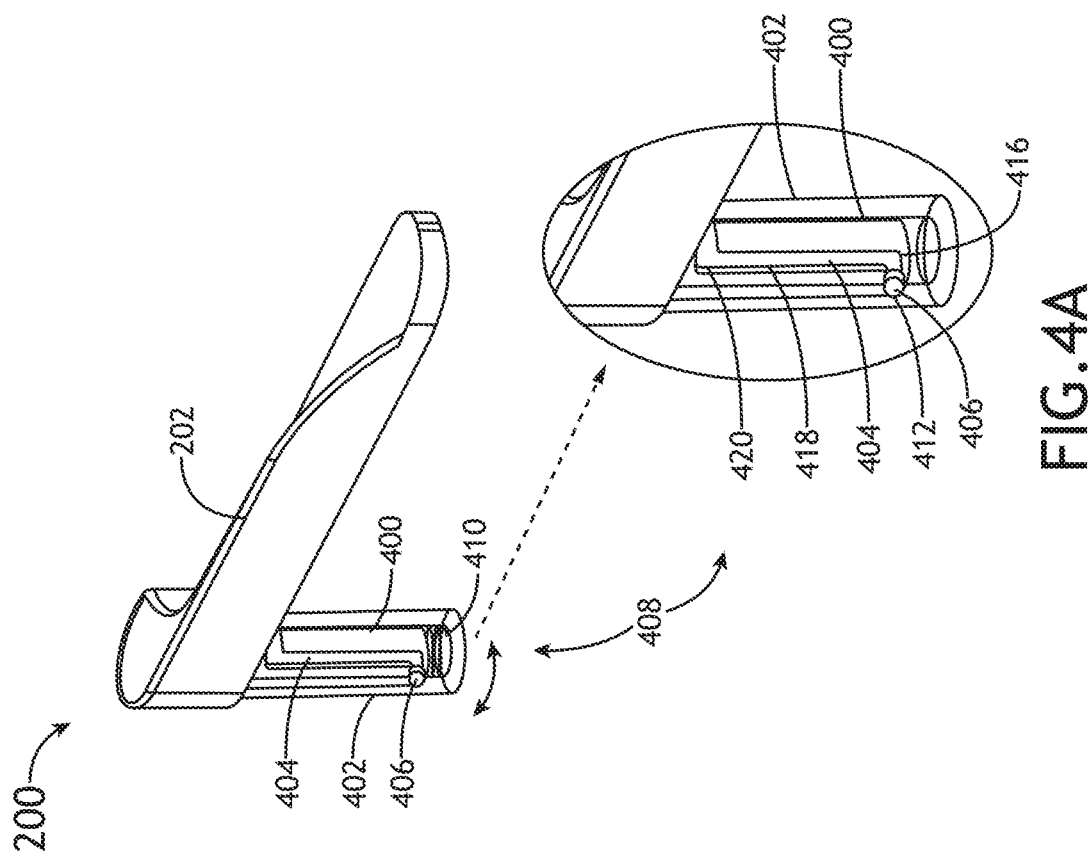
FIG. 4A illustrates a perspective view of an aircraft trolley retention device, in accordance with one or more embodiments of the disclosure.

As illustrated in FIG. 4A, the retention latch 202 may be in a closed position (e.g., configured to retain a trolley 108), with the pin 406 set in a first end 412 of the track 404. The first end 412 of the track 404 may lead to a first horizontal or substantially-horizontal section 414 of the track 404. For example, the first horizontal or substantially-horizontal section 414 of the track 404 may be a section not configured to allow actuation in a vertical or substantially-vertical direction when the shaft 400 is acted on by the spring 410, preventing the possible stowing of the retention latch 202 (e.g., which may interfere with the trolley bay door 106, or the like). The first horizontal or substantially-horizontal section 414 of the track 404 may lead to a first corner 416 of the track 404.

As illustrated in FIG. 4B, the retention latch 202 may actuate in a first direction from the first end 412 of the track 404 to the first corner 416 of the track 404. The first corner 416 of the track 404 may lead to a vertical or substantially-vertical section 418 of the track 404. For example, the vertical or substantially-vertical section 418 of the track 404 may include a section configured to allow actuation in a vertical or substantially-vertical direction when the shaft 400 is acted on by the spring 410. The vertical or substantially-vertical section 418 of the track 404 may lead to a second corner 420 of the track 404.

Although not shown, the actuation in the first direction from the first end 412 of the track 404 to the first corner 416 of the track 404 may be following a force applied to the retention latch 202 by a user. For example, the force applied by the user may include a rotational force.

Figure 4C:
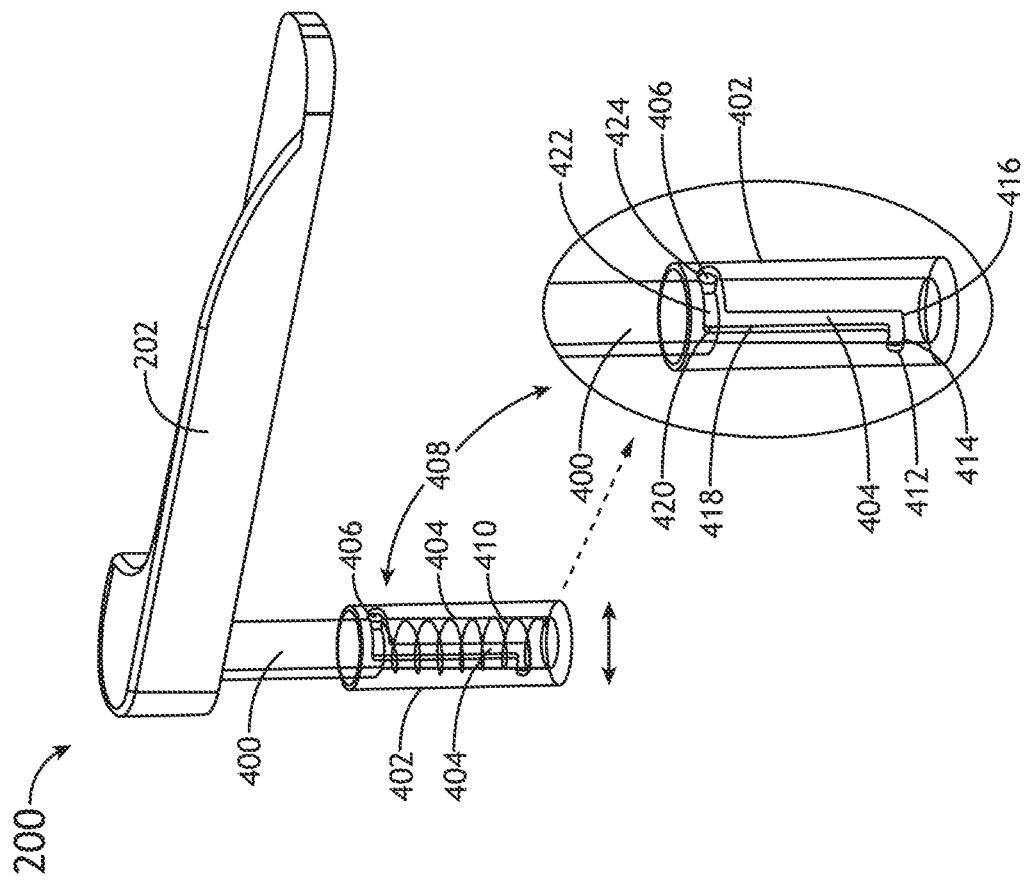
FIG. 4C illustrates a perspective view of an aircraft trolley retention device, in accordance with one or more embodiments of the disclosure.

As illustrated in FIG. 4C, the pin 406 may actuate in a second direction along the vertical or substantially-vertical section 418 of the track 404. For example, the actuation along the vertical or substantially-vertical section 418 of the track 404 may be driven by the shaft 400 being acted on by the spring 410. The pin 406 may actuate from the first corner 416 of the track 404 to the second corner 420 of the track 404. The second corner 420 of the track 404 may lead to a second horizontal or substantially-horizontal section 422 of the track 404. The second horizontal or substantially-horizontal section 422 of the track 404 may lead to a second end 424 of the track 404.

Figure 4D:
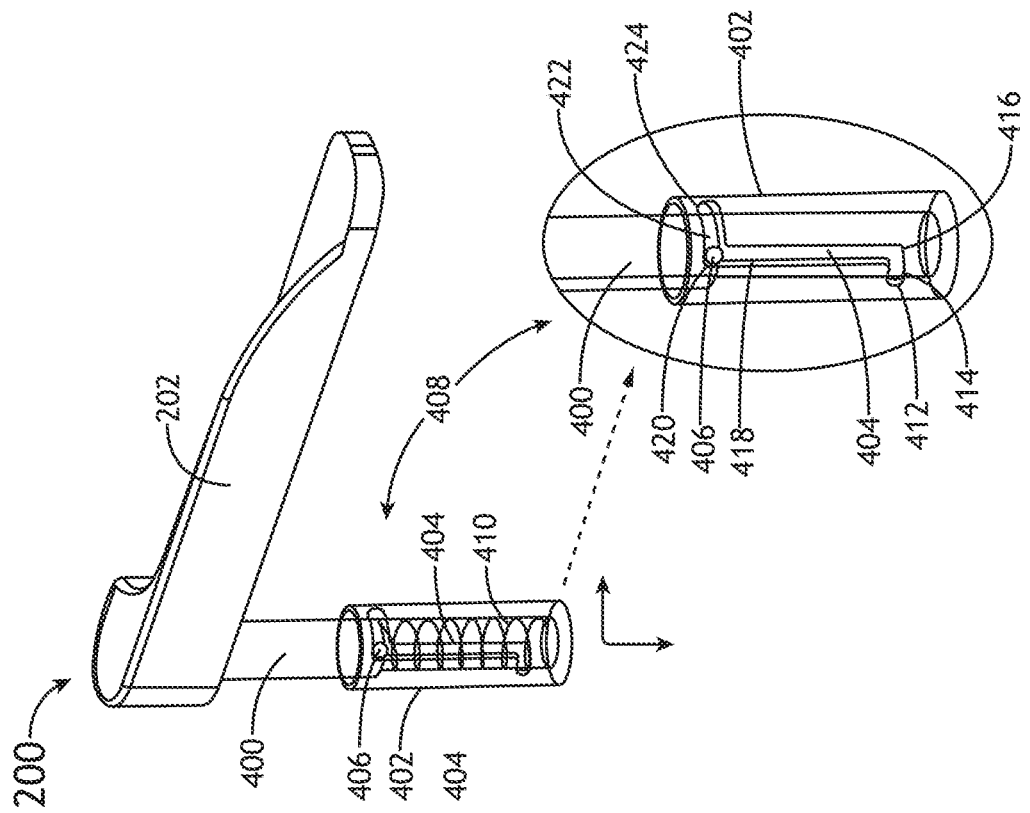
FIG. 4D illustrates a perspective view of an aircraft trolley retention device, in accordance with one or more embodiments of the disclosure.

As illustrated in FIG. 4D, the pin 406 may rest in the second end 424 of the track 404 following an actuation in a third direction from the second corner 420 of the track 404 to the second end 424 of the track 404. Here, the retention latch 202 may be in an open position.

Although not shown, the actuation in the third direction from the second corner 420 of the track 404 to the second end 424 of the track 404 may be following a force applied to the retention latch 202 by a user. For example, the force applied by the user may include a rotational force.

Although not shown, the retention latch 202 may be actuated from the open position to the closed position via a force applied to the retention latch 202 by a user to overcome the force applied by the spring 410. For example, the force applied by the user may include a first amount of force configured to cause the pin 406 to actuate from the second end 424 of the track 404 to the corner of the track 404, and may include a second amount of force configured to cause the pin 406 to actuate from the corner of the track 404 to the first end 412 of the track 404. Therefore, the above description should not be interpreted as a limitation on the present disclosure but merely an illustration.

In this regard, the aircraft trolley retention device 200 may be configured to allow the trolley bay doors 106 to retain the trolley 108 and/or the trolley content doors 110, while preventing the trolley bay doors 106 from deflecting beyond a selected distance. The aircraft trolley retention device 200 may be configured to be separated from (e.g., not collide or otherwise interfere with) the striker plate 116 corresponding to the handle 118 of the trolley bar door 106.

Although embodiments of the disclosure illustrate the aircraft trolley retention device 200 being integrated within the aircraft cabin 100, it is noted herein, however, that the aircraft trolley retention device 200 and/or components of the aircraft trolley retention device 200 are not limited to the aviation environment and/or the aircraft components within the aviation environment. For example, the aircraft trolley retention device 200 and/or components of the aircraft trolley retention device 200 may be configured for any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the aircraft trolley retention device 200 and/or components of the aircraft trolley retention device 200 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An aircraft trolley retention device, comprising:
    a retention latch, the retention latch including a shaft;
    a sleeve, the sleeve being configured to receive the shaft, the sleeve being configured to be coupled to an aircraft trolley bay of an aircraft monument;
    an interlocking assembly, the shaft including a first component of the interlocking assembly, the sleeve including a second component of the interlocking assembly, the retention latch being configured to actuate between a closed position and an open position following an application of a force to the retention latch,
    the first component and the second component of the interlocking assembly being configured to guide the retention latch during the actuation between the closed position and the open position,
    the retention latch being configured to retain an aircraft trolley within the aircraft trolley bay when the retention latch is in the closed position,
    a portion of the retention latch being configured to be positioned in front of a striker plate corresponding to a handle of an aircraft trolley bay door of the aircraft trolley bay when the retention latch is in the open position; and a spring disposed within the shaft and between the shaft and the sleeve, the spring being configured to apply the force to the retention latch via the shaft during the actuation between the closed position and the open position, the first component of the interlocking assembly including a pin, the second component of the interlocking assembly including a track, the pin being configured to actuate within the track following the application of force, the track comprising a horizontal section between a first end and a corner, wherein the shaft is configured to rotate relative to the sleeve with actuation of the pin between the first end and the corner.

2. The retention device of claim 1, the track comprising: an angled section between the corner and a second end.

3. The retention device of claim 2, the pin being configured to actuate from the first end to the second end via the horizontal section, the corner, and the angled section when the retention latch actuates between the closed position and the open position following the application of the force.

4. The retention device of claim 2, the spring being configured to apply the force to the retention latch during the actuation from the corner to the second end via the angled section when the retention latch actuates between the closed position and the open position.

5. The retention device of claim 1, wherein the horizontal section is a first horizontal section; the track comprising:
a vertical section between the first corner and a second corner; and
a second horizontal section between the second corner and a second end.

6. The retention device of claim 5, the pin being configured to actuate from the first end to the second end via the first horizontal section, the first corner, the vertical section, the second corner, and the second horizontal section when the retention latch actuates between the closed position and the open position following the application of the force.

7. The retention device of claim 5, the spring being configured to apply the force to the retention latch during the actuation from the first corner to the second corner via the vertical section when the retention latch actuates between the closed position and the open position.

8. The retention device of claim 1, the retention latch being configured to retain the aircraft trolley within the aircraft trolley bay via contact with a surface of an aircraft trolley content door of the aircraft trolley when the retention latch is in the closed position.

9. The retention device of claim 1, the retention latch being configured to retain the aircraft trolley within the aircraft trolley bay via contact with a surface of a body of the aircraft trolley when the retention latch is in the closed position.

10. The retention device of claim 1, the retention latch configured to allow the aircraft trolley to be removed or inserted into the aircraft trolley bay when the retention latch is in the open position.

11. The retention device of claim 1, the portion of the retention latch configured to be separated a selected distance from the striker plate corresponding to the aircraft trolley bay door of the aircraft trolley bar when the retention latch is in the open position.

12. The retention device of claim 11, the retention latch configured to be in a first plane shared with the striker plate when in the closed position, the retention latch configured to be in a second plane when in the open position, the second plane spaced a selected distance outward from the first plane with respect to the trolley bay such that the retention latch is configured to be separated the selected distance from the striker plate.

13. An aircraft monument, comprising:
an aircraft trolley;
an aircraft trolley bay, the aircraft trolley bay including an aircraft trolley bay door, the aircraft trolley bay including a striker plate corresponding to a handle of the aircraft trolley bay door; and
an aircraft trolley retention device, comprising:
a retention latch, the retention latch including a shaft;
a sleeve, the sleeve being configured to receive the shaft, the sleeve being configured to be coupled to the aircraft trolley bay;
an interlocking assembly, the shaft including a first component of the interlocking assembly, the sleeve including a second component of the interlocking assembly,
the retention latch being configured to actuate between a closed position and an open position following an application of a force to the retention latch,
the first component and the second component of the interlocking assembly being configured to guide the retention latch during the actuation between the closed position and the open position,
the retention latch being configured to retain the aircraft trolley within the aircraft trolley bay when the retention latch is in the closed position,
a portion of the retention latch being configured to be positioned in front of the striker plate when the retention latch is in the open position; and
a spring disposed within the shaft and between the shaft and the sleeve, the spring being configured to apply the force to the retention latch via the shaft during the actuation between the closed position and the open position,
the first component of the interlocking assembly including a pin, the second component of the interlocking assembly including a track, the pin being configured to actuate within the track following the application of force,
the track comprising a horizontal section between a first end and a corner, wherein the shaft is configured to rotate relative to the sleeve with actuation of the pin between the first end and the corner.

14. The aircraft monument of claim 13, the aircraft trolley comprising an aircraft trolley content door, the retention latch configured to retain the aircraft trolley aircraft trolley content door within the aircraft trolley bay via contact with a surface of the aircraft trolley content door when the retention latch is in the closed position.

15. The aircraft monument of claim 14, the retention latch configured to allow the aircraft trolley to be removed or inserted into the aircraft trolley bay when the retention latch is in the open position.

16. The aircraft monument of claim 15, the portion of the retention latch configured to be separated a selected distance from the striker plate corresponding to the aircraft trolley bay door of the aircraft trolley bar when the retention latch is in the open position.

17. The aircraft monument of claim 16, the retention latch configured to be in a first plane shared with the striker plate when in the closed position, the retention latch configured to be in a second plane when in the open position, the second plane spaced a selected distance outward from the first plane with respect to the trolley bay such that the retention latch is configured to be separated the selected distance from the striker plate.

* * * * *